Feb. 10, 1925.
W. E. WALLER
POULTRY PERCH
Filed Aug. 13, 1924
1,526,029
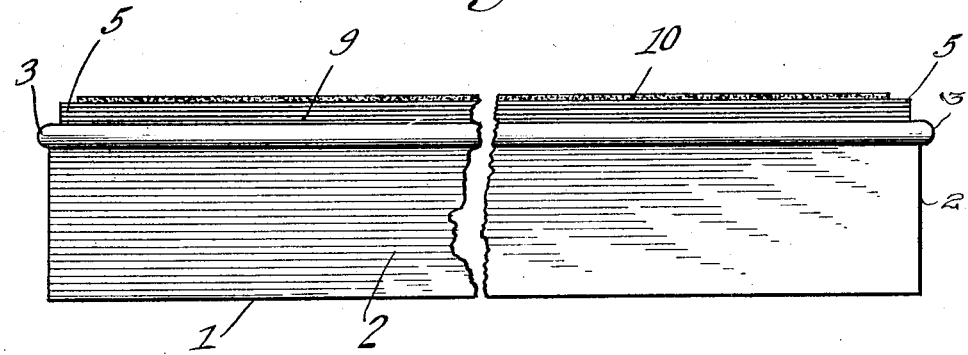
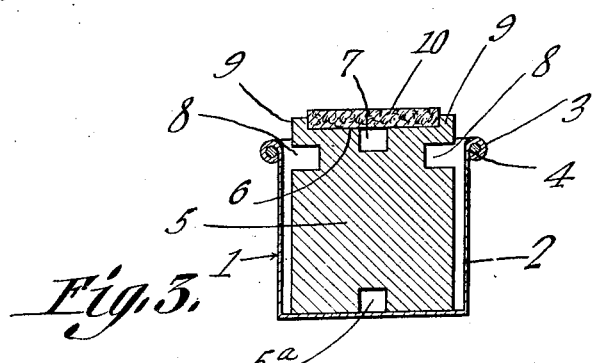
W. E. Waller
Inventor Patented Feb. 10, 1925.

1,526,029

UNITED STATES PATENT OFFICE.

WARREN E. WALLER, OF CHARLES CITY, IOWA.

POULTRY PERCH.

Application filed August 13, 1924. Serial No. 731,833.

*To all whom it may concern:*

Be it known that I, WARREN E. WALLER, a citizen of the United States, residing at Charles City, in the county of Floyd and State of Iowa, have invented a new and useful Poultry Perch, of which the following is a specification.

This invention relates to poultry appliances and more particularly to perches or roosts.

The object of the invention is to provide a roost or perch which is not only comfortable for the fowls but which is equipped with means for containing an insecticide whereby the mites and lice are destroyed while the poultry sleep.

Another object of the invention is the provision of means for retaining an insecticide which means also form a protection for the feet of the fowl.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation with parts broken out of a perch constructed in accordance with this invention;

Fig. 2 is a plan view thereof with the insecticide retaining pad removed; and

Fig. 3 is a transverse section.

This invention comprises a roost bar or perch 1 comprising a metal container 2 shown rectangular in form and provided at its upper end with a reinforcing bead 3 which strengthens the container. The reinforce is here shown in form of a wire 4 rolled in the bead 3.

This container 2 may be supported in the poultry house by any suitable means not shown. This container 2 is water tight to adapt it to catch and retain the insecticide which may drop from the pad presently to be described and to hold it so that it may be reabsorbed.

Mounted in the container 2 is a core 5 preferably constructed of porous wood and shaped to conform to the shape of the container being slightly smaller as is shown clearly in Fig. 3 to permit liquid to be held in the container between the core and the side walls thereof. This wooden core 5 extends above the top of the container and is provided in its upper face with a seat 6 extending throughout the length thereof and which is designed to receive an absorbing pad 10 constructed of felt or other suitable material. This pad is designed to be saturated with a poison or insecticide so that the poultry roosting on the perch will contact with the pad and the body of the poultry be fumigated by the insecticide.

Arranged below the pad seat 6 and extending longitudinally of the core 5 is a groove or trough 7 designed to hold a liquid poison and this groove preferably decreases in depth toward its opposite ends.

The core 5 is also provided in its opposite side faces adjacent its upper portion with longitudinally extending grooves 8 whereby projecting side flanges 9 are formed designed to be gripped by the feet of the fowl roosting on the perch.

The core 5 is also provided in its bottom or lower face with a longitudinally extending groove $5^a$ which is provided to permit the poisonous liquid to soak into the wooden core more readily and more thoroughly so that the core will be impregnated throughout with the poison, the fumes of which will rise into contact with the mite and lice on the body of the fowl and destroy them.

When the perch is in use the container 2 is filled with a suitable insecticide which gradually impregnates the porous wooden core 5 and the groove 7 is filled with said insecticide which penetrates the pad 10 being absorbed thereby and which serves to keep the vermin from the fowl while at roost and to destroy those that are already on them. The pad 10 also operates to keep the feet of the fowl from contact with the metal container and so protect them from undue chilling in winter.

A perch such as is herein described and shown is very simple in construction and when necessary the core 5 may be removed for cleaning or otherwise without necessitating removal of the container 2 although obviously such container may be removed and cleaned when desired.

I claim:—

1. A poultry perch comprising a wooden bar having a seat in its upper face and a liquid containing groove located below said seat, an absorbent pad mounted in said seat and extending above the upper face of the perch, said bar being provided in its side faces near its top with longitudinally extending grooves to form flanges for engagement by the toes of the fowl.

2. A poultry perch comprising an elongated metal container open at its top, a wooden core mounted in said container and conforming substantially to the shape thereof, said core projecting at its upper end above said container and provided in its upper face with a longitudinally extending seat, an absorbent pad mounted in said seat and projecting above the top of the core, a liquid containing groove or recess formed under said pad, and said core having a longitudinally extending groove in its lower face to permit a liquid to saturate the core.

In testimony that I claim the foregoing as my own, I have hereto affixed my signature in the presence of two witnesses.

WARREN E. WALLER.

Witnesses:
   EDGAR BALL,
   CARL C. MAGDSICK.